2 Sheets, Sheet 1.
M. J. Hine,
Making Stares.
Nº 79,351. Fig. 1 Patented June 30, 1868.
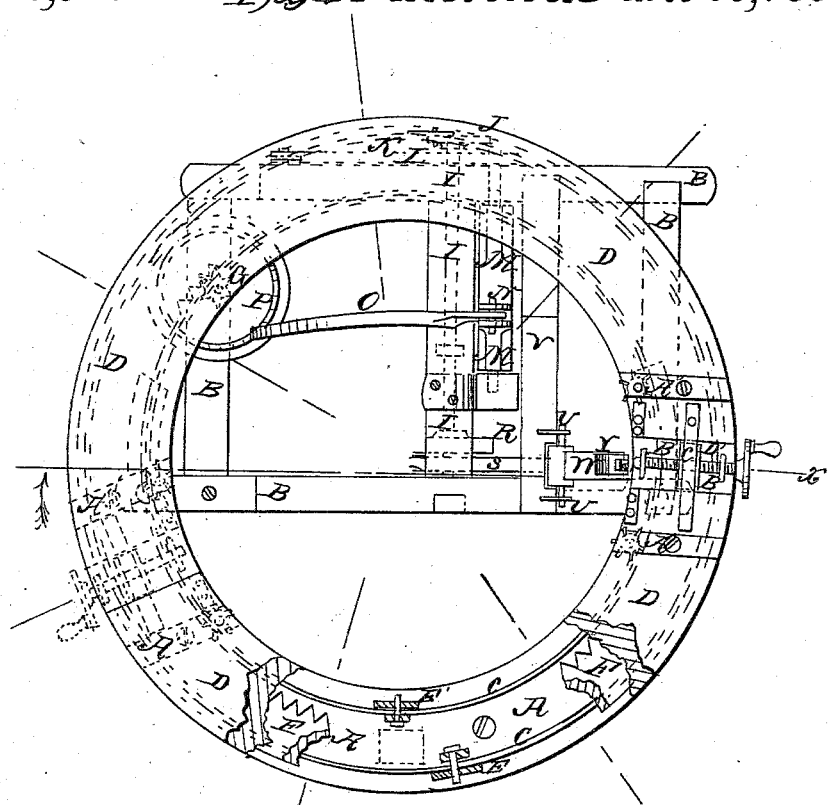
Fig. 2
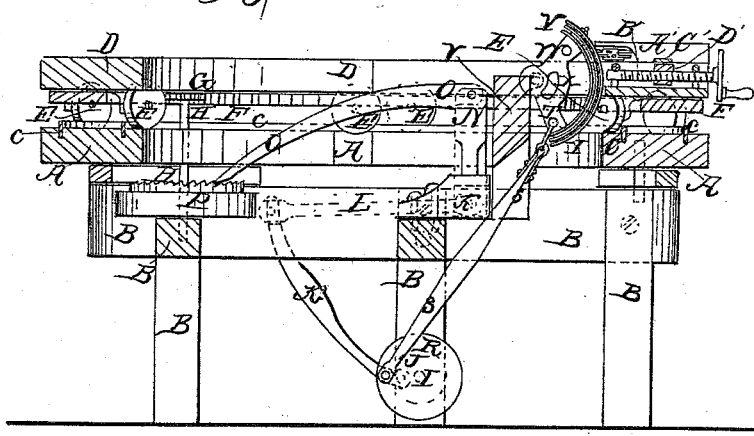
Witnesses:
J. Alison Fraser
Alex. F. Roberts
Inventor
Miller J. Hine
Per Munn & Co
Attorneys M. J. Hine,
Making Staves.
Nº 79,351.    Patented June 30, 1868.
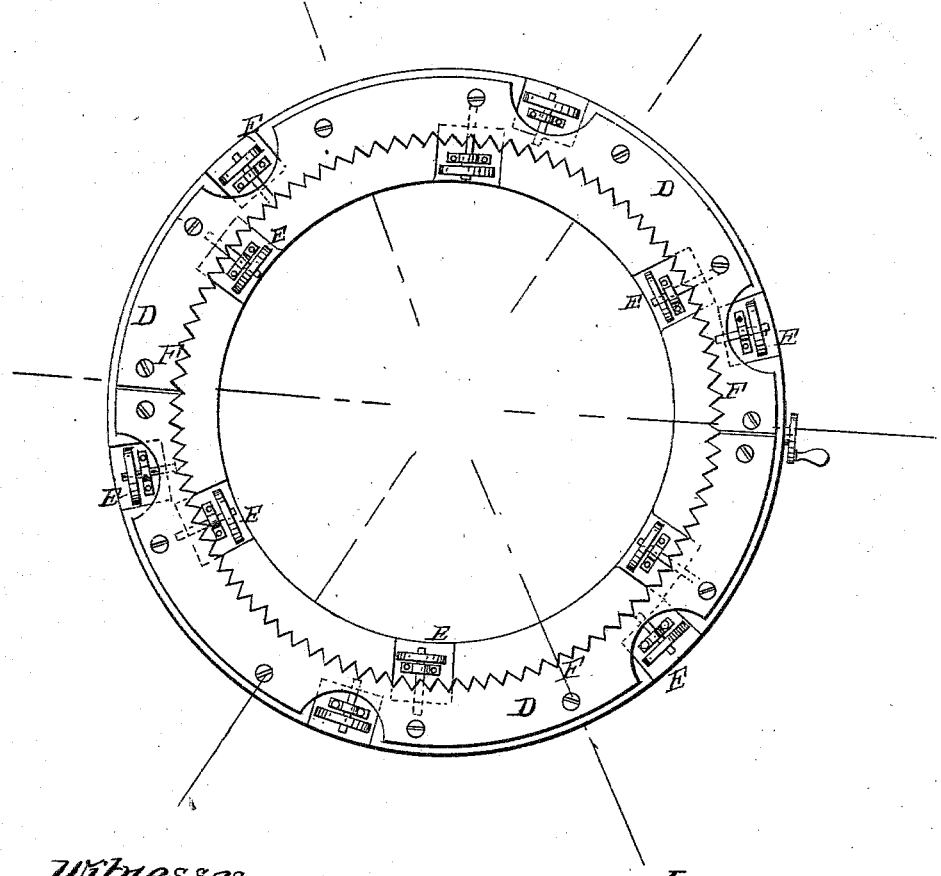
Fig: 3
Witnesses.    Inventor.

United States Patent Office.

MILLER J. HINE, OF EQUALITY, ILLINOIS.

Letters Patent No. 79,351, dated June 30, 1868.

IMPROVEMENT IN SHINGLE-MACHINES.

The Schedule referred to in these Letters Patent and making part of the same.

TO ALL WHOM IT MAY CONCERN:

Be it known that I, MILLER J. HINE, of Equality, in the county of Gallatin, and State of Illinois, have invented a new and useful Improvement in Machine for Sawing Staves; and I do hereby declare that the following is a full, clear, and exact description thereof, which will enable those skilled in the art to make and use the same, reference being had to the accompanying drawings, forming part of this specification, in which—

Figure 1 is a top or plan view of my improved machine, part being broken away to show the construction.

Figure 2 is a vertical cross-section of the same, taken through the line $x\ x$, fig. 1.

Figure 3 is an under side view of the circular feed-carriage.

Similar letters of reference indicate corresponding parts.

My invention has for its object to furnish an improved machine for sawing staves, which shall be simple in construction, effective in operation, and convenient in use.

And it consists in the circular carriage with a continuous feed; in the combination of the swivelled screw and bed or feed-plate with the circular carriage; and in the combination of several curved saws with the vertically-working arms of a rock-shaft, the whole being constructed and arranged as hereinafter more fully described.

A is the circular bed-plate of the machine, which rests upon and is secured to the framework B.

Upon the upper side of the circular plate A is formed a circular track, C, to guide the carriage D as it is fed around upon the said bed-plate A.

E are wheels which work in bearings attached to the under side of the carriage D, and which roll along the bed-plate A, and are guided and kept in proper position by the track C.

Upon the under side of the carriage D is formed, or to it is attached a circular gear-wheel, F, having cogs or teeth formed in its inner or concave side, as shown in figs. 1, 2, and 3, into which teeth mesh the teeth of the pinion-wheel G, attached to the upper end of the vertical shaft H, which revolves in bearings in the circular bed-plate A, and in the frame B, as shown in fig. 2.

I is the driving-shaft, which revolves in bearings in the lower part of the frame B, and to which motion may be given by any desired or convenient power.

To the outer end of the shaft I is attached a crank-wheel, J, to the crank-pin of which is pivoted a connecting-bar, K, the upper end of which is jointed to the outer end of the connecting-bar or arm L, the inner end of which is rigidly attached to the end of the rock-shaft M.

The rock-shaft M works in bearings attached to the frame B, and has an arm, N, rigidly attached to it, to the outer end of which is jointed the end of the pawl O, the edge or working end of which takes hold of the teeth of the ratchet-wheel P, attached to the vertical shaft H, so as to feed the carriage D forward continuously.

To the other or inner end of the driving-shaft I is attached a crank-wheel, R, to the crank-pin of which is pivoted the lower end of the connecting-bar S, the upper end of which is pivoted to the arm T of the rock-shaft U.

The rock-shaft U works in bearings in the support or frame V, attached to the frame B, and has two arms, T and W, rigidly attached to it and to each other.

The arms T and W are strengthened by the brace X, securely attached to or formed solidly upon them.

To the outer ends of the arms T and W are attached the curved saws Y, which are secured to said arms at a distance from each other equal to the desired thickness of the staves.

A' are the head-blocks, between which the timber is placed from which the staves are to be sawn, and which should be adjustably attached to the carriage D, so that they may be adjusted according to the size of the timber or staves.

B' is a screw placed in a channel or slot in the carriage D, midway between the blocks A', which is secured in place and swivelled to said carriage by collars, as shown in figs. 1 and 2, and which is operated by a hand-wheel or crank attached to its outer end.

C' is a sliding bed-plate, fitting into the space between the blocks A', as shown in fig. 1

To the lower side of the sliding plate C' is attached a nut, D', the thread of which fits upon the thread of the screw B'; so that by revolving the said screw the timber may be fed forward into proper position to be acted upon by the saws Y.

The machine represented in the drawings is designed to have seven sets of head-blocks, for holding the stave-timber to be sawn, two of which are represented, one in black lines and one in red lines, and saws the staves with the entire bilge.

If it is desired to form them with less bilge, the diameter of the machine should be increased.

I claim as new, and desire to secure by Letters Patent—

1. The combination of the circular toothed wheel F, pinion-wheel G, vertical shaft H, ratchet-wheel P, pawl O, arm N, rock-shaft M, arm L, connecting-bar K, and crank-wheel J, with each other, and with the carriage D and driving-shaft I, all constructed and arranged to operate substantially as herein shown and described, and for the purpose set forth.

2. The combination of the swivelled screw B' and sliding bed-plate C' with the carriage D and blocks A', substantially as herein shown and described, and for the purpose set forth.

MILLER J. HINE.

Witnesses:
  LIZZIE HINE,
  PETER HINE.